United States Patent [19]
Kobelt

[11] 3,900,090
[45] Aug. 19, 1975

[54] ENGINE REMOTE CONTROL
[76] Inventor: Jack R. Kobelt, 235 E. 5th Ave., Vancouver 10, British Columbia, Canada
[22] Filed: Aug. 27, 1973
[21] Appl. No.: 391,814

[52] U.S. Cl. .................. 192/.094; 60/906; 91/36; 91/414; 192/.096; 192/.098
[51] Int. Cl. ............................................. F16d 67/02
[58] Field of Search .......... 91/36, 414; 60/97 P, 906; 115/34 R; 192/.096, .098, .094

[56] References Cited
UNITED STATES PATENTS
| | | | |
|---|---|---|---|
| 3,379,099 | 4/1968 | Misscoux | 91/36 |
| 3,543,891 | 12/1970 | Mathers | 192/.098 |
| 3,727,737 | 4/1973 | Phinney | 192/.098 |

Primary Examiner—Martin P. Schwadron
Assistant Examiner—Abraham Hershkovitz

[57] ABSTRACT

This disclosure pertains to a fluid control apparatus which provides remote control and sequencing of an engine from one or more operator stations. A clutch control valve at any operator station causes a pressure proportional linear actuator to oscillate a cam means which in turn sequentially actuates throttle, throttle-boost, clutch, non-lag, and shaft-brake valves. Throttle-boost and non-lag cams provide a predetermined time-delay in the operation of their respectively actuated valves.

15 Claims, 4 Drawing Figures

ENGINE REMOTE CONTROL

This invention relates to novel structure in devices and combinations thereof which are known in the art to which they pertain as fluid control devices, fluid control circuits, fluid control systems, or are of the general character of fluid power systems which either transmit or control power through the use of a pressurized fluid within an enclosed circuit. In general, my present invention relates to a fluid control circuit which provides remote control to an engine having a fluid controlled throttle device and one or more fluid controlled clutch devices or clutch actuating devices. Specifically, my present invention may be used to control throttle and clutch actuating devices on an engine in a marine power plant installation from a location much removed therefrom, say at an operator station on the bridge of a vessel. Whereas in the prior art, relay valves have been employed to provide the necessary sequencing of throttle-boost and actuation, shaft braking, and clutch actuation, in remotely cycling an engine from neutral into gear or from one gear mode into another, 1 disclose herein a much simplified fluid control apparatus employing mechanical oscillating cam means which may be visually inspected and mechanically adjusted accordingly to produce desired engine throttle control and clutch control sequencing.

The aforementioned relay valves of the prior art each comprise a fluid control valve portion and an actuator portion. The actuator portion in turn comprises a spring portion, a piston or diaphragm portion, and a cylinder portion. Each fluid control valve is operated by fluid pressure and flow sufficient to overcome the spring force in each cylinder portion. The sequential interrelationship of a plurality of fluid control valves is achieved by presetting the spring force in the actuator portion of each control valve. Each fluid control valve is mechanically independent of each other control valve. Variations in operating characteristics of any one or more actuator portion alters the predetermined timed interrelationship of sequential operations in a fluid power circuit. Failure or malfunction of any component in the actuator portion of any one relay valve, such as the spring portion or diaphragm portion, results in either the loss of one sequential operation in the fluid power circuit or disruption of the timing of several circuit functions.

Generally, my present invention comprises a single pressure-proportional linear actuator means actuating an oscillating cam means which in turn actuates a plurality of fluid control valves, thereby replacing and performing the operative function of a plurality of relay valves. The pressure of a fluid and its rate of flow into the linear actuator is ultimately controlled by a clutch fluid control valve and valve and ducting means which determine the amount and rate of movement of the oscillating cam means with respect to the plurality of fluid control valves. The sequential interrelationship of the plurality of fluid control valves is achieved by visually and mechanically determining the shape and spatial interrelationship of a plurality of cams. The timed sequence of operation of each valve actuated by the cam means, once preset, is mechanically fixed in relation to the operation of each other valve. A variation in the operating characteristics of the single linear actuator will affect all of the cam actuated valves equally, as to overall sequence time length, while leaving the sequential time proportionality of operation of the valves intact; that is, a single adjustment of fluid flow will alter the sequence time length but not the proportional timed relationship of one valve operation with respect to all others. Failure or malfunction of the single pressure-proportional linear actuator is easier to prevent, detect, and repair than would be the case with a plurality of relay valves of the prior art, each having its own actuator portion.

In its simplest form, my present invention employs a pressurized fluid source, clutch and throttle fluid control valves normally situated remotely from a controlled engine, a pressure-proportional linear actuator and oscillating cam means and throttle control and boost valves in operative interrelation, normally mounted on a panel in the vicinity of the controlled engine, and clutch and throttle controlling fluid operated devices or servo-mechanisms in operative relation with the controlled engine. Interconnection of clutch and throttle control valves at a plurality of control stations may be accomplished through the use of shuttle valves. Control of more than one clutch device or clutch servo-mechanism may be achieved by the use of an additional clutch control valve at each operator station, and interconnecting the fluid signal from each clutch control valve through shuttle valves to the pressure proportional linear actuator. Where two clutch devices or clutch servomechanisms are employed, such as in a marine power plant installation having forward and reverse modes, a non-lag cam and system of relay valves is disclosed whereby a desired neutral time delay is provided during sudden shifts from forward to reverse but no such lag is provided in shifts out of neutral into either the reverse or forward modes. Control of a pair of direct fluid actuated clutch devices may be achieved through controlling a pair of differential interlock valves with the clutch control valves such that the interlock valves in turn control the clutch devices; in this case a clutch cam actuates a clutch valve interconnecting the pressurized fluid source with the interlock valves. Stopping a driven member in sequence with clutch operation is accomplished by a brake cam, which actuates a brake valve, and a brake means operatively mounted with respect to a driven member.

Therefore, it is one object of my invention to provide an engine remote control apparatus which controls and sequences operation of clutch and throttle devices.

It is another object of my invention to provide mechanical sequencing means whereby a single pressure-proportional linear actuator determines the time-length of the sequence of throttle and throttle-boost control in relation to clutch actuation.

It is yet another object of my invention to provide means whereby the time proportionality between actuation of clutch and throttle control valves may be preset mechanically and inspected visually.

Still another object of this invention is to provide an engine remote control apparatus adapted to control two clutch devices, such as forward and reverse clutches, whereby a neutral time-delay is provided in sudden shifts from one clutch device to the other, whereas no time-delay is provided in normal shifts from neutral to either one of the clutch devices.

Yet another object of my present invention is to provide an engine remote control apparatus adapted to control clutch and throttle devices from one or more operator stations.

A further object of my present invention is to provide an engine remote control apparatus adapted to interlock actuation of a pair of clutches whereby actuation of only one clutch at a time is permitted.

It is yet another object of my present invention to provide an engine remote control apparatus in which a driven member may be stopped and released in sequenced relation to the actuation of throttle and clutch devices.

These and further objects of my invention, which reside in the details of its structure and operation, will be evident from a study of the following disclosure and accompanying drawings which illustrate a preferred embodiment of the invention. This embodiment is merely exemplary and is not intended to detract from the full scope of the invention as set out in the annexed claims.

In the drawings, wherein like numerals refer to like parts:

Figure 1:
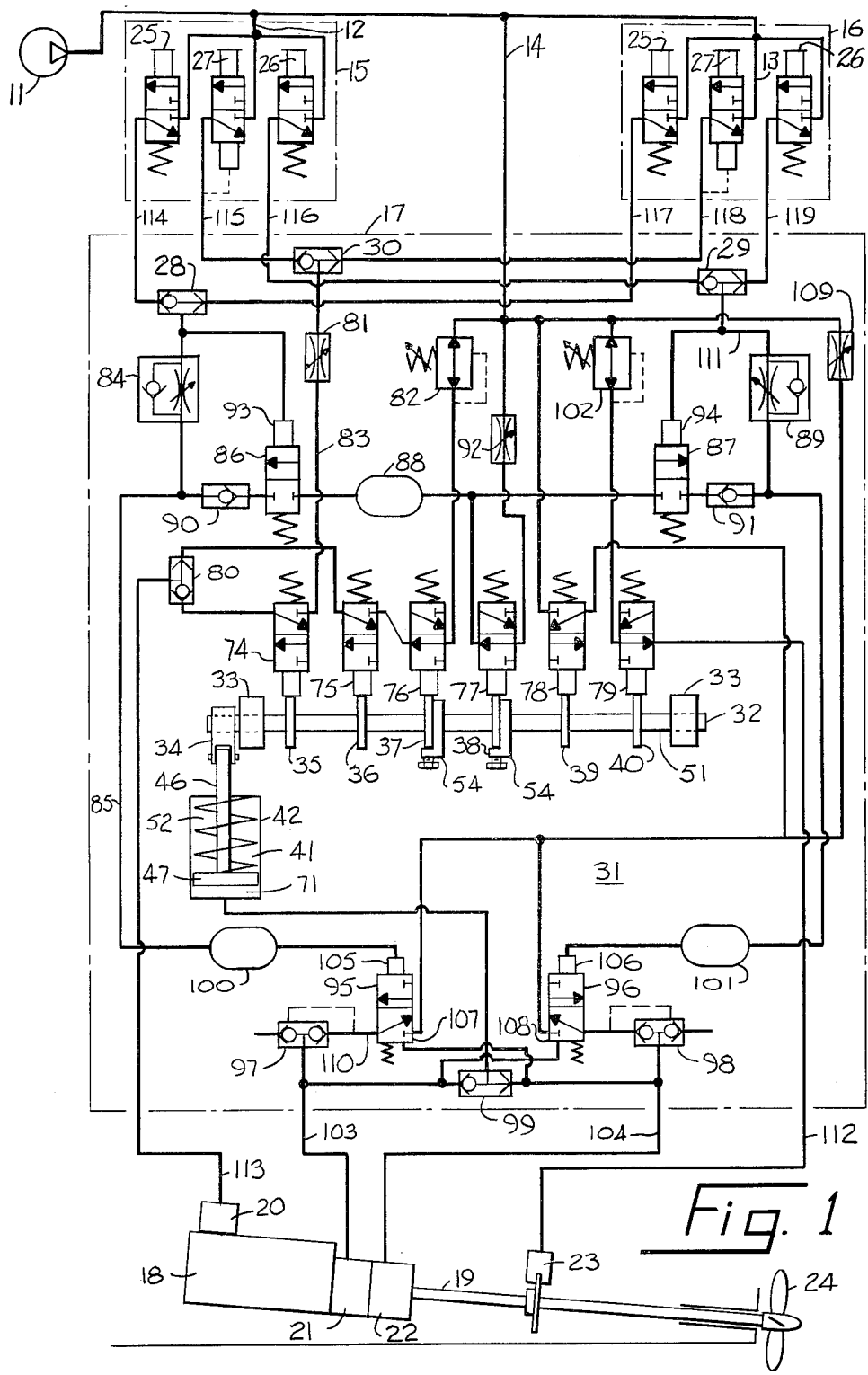
FIG. 1 is a schematic diagram of my invention employing for the most part fluid control device symbols which are readily understood to one skilled in this art.

Referring now to the drawings, FIG. 1 illustrates a schematic diagram of an engine remote control apparatus in accordance with my present invention. A pressurized fluid source 11 is duct connected, by means of ducts 12, 13, and 14, respectively to operator control stations 15 and 16 and to remote control panel 17. Remote control panel 17 is duct connected to an engine power plant installation comprising engine means 18, driven member 19, fluid controlled throttle device 20, first and second fluid controlled clutch devices 21 and 22, and brake means 23. For illustrative purposes, driven member 19 is operatively connected to fixed blade propeller means 24, pressurized fluid source 11 and panel 17 are located in the vicinity of engine means 18, and control stations 15 and 16 are respectively on the deck and bridge of a marine vessel.

Fluid source 11 is indicated symbolically as a pneumatic fixed displacement compressor; accordingly the various valves of stations 15 and 16 and panel 17 which have exhaust ports are shown to exhaust to atmosphere. Clearly, source 11 could readily be hydraulic, appropriate exhaust ducting returning control fluid to a sump for recirculation through source 11.

Control stations 15 and 16 comprise equivalent first and second clutch fluid control valves 25 and 26, and throttle fluid control valves 27. Clearly, a clutch control valve is required at each of control stations 15 and 16 for each of clutch devices 21 and 22. Clutch valves 25 and 26, in practice, are usually manually-operated, normally-closed two-position three-way fluid control valves. Throttle valves 27 are usually manually-operated pilot-compensated normally-closed three-way pressure-varying fluid control valves. Signals from each one of control valves 25, 26, or 27 are directed respectively through shuttle valves 28, 29, and 30 whereby to produce a single signal for use at control panel 17. Shuttle valves 28, 29 and 30 are conventionally called two-way check-valves with cross-bleed permitting reversible flow along only one of two paths at one time. It should be clear to one skilled in this art that additional control stations may be added to the apparatus of FIG. 1, signals therefrom being directed through a network of shuttle-valves whereby to produce single clutch and throttle signals at panel 17. It should however be noted that, in practice, shuttle valves 28, 29 and 30 are usually most conveniently located at panel 17, inasmuch as ducting from valves 25, 26, and 27 originates at diverse locations.

Engine means 18, throttle device 20, clutch devices 21 and 22, and brake means 23 are indicated schematically for purposes of this disclosure, inasmuch as such elements are familiar to one skilled in this art. For instance, throttle device 18 may be an engine governor or fluid actuated throttle actuator. Clutch devices 21 and 22 may be either fluid energized clutches, fluid de-energized clutches, fluid operated transmission gear shift bands, or fluid actuated clutching and declutching servomechanisms.

Figure 2:
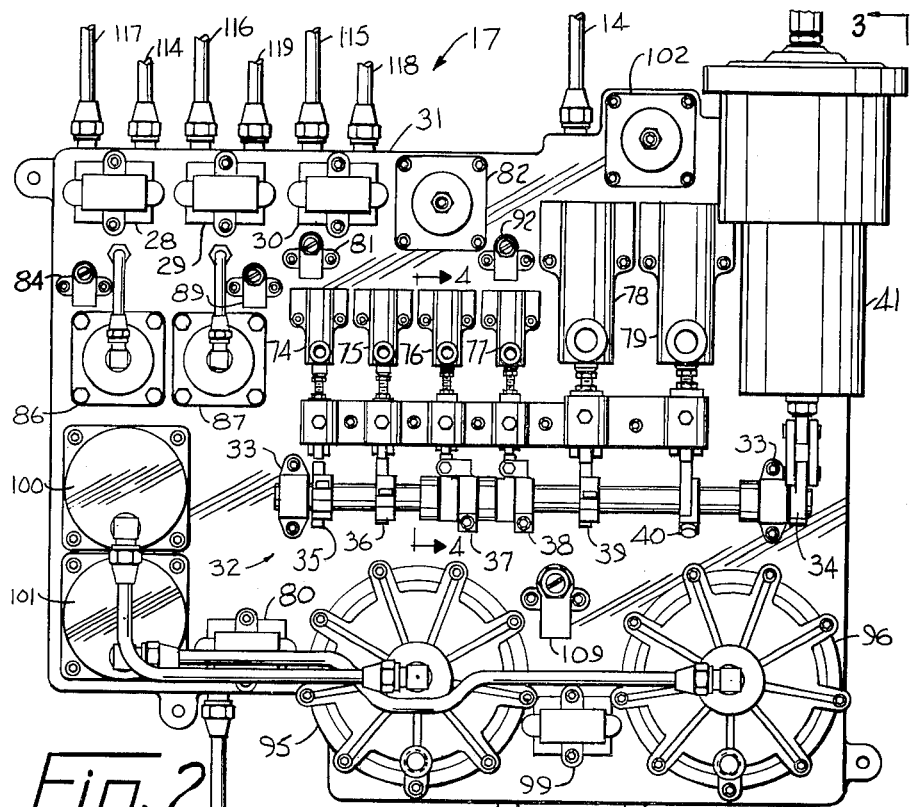
FIG. 2 illustrates a plan view of a control panel upon which many of the elements of FIG. 1 are mounted.
Figure 3:
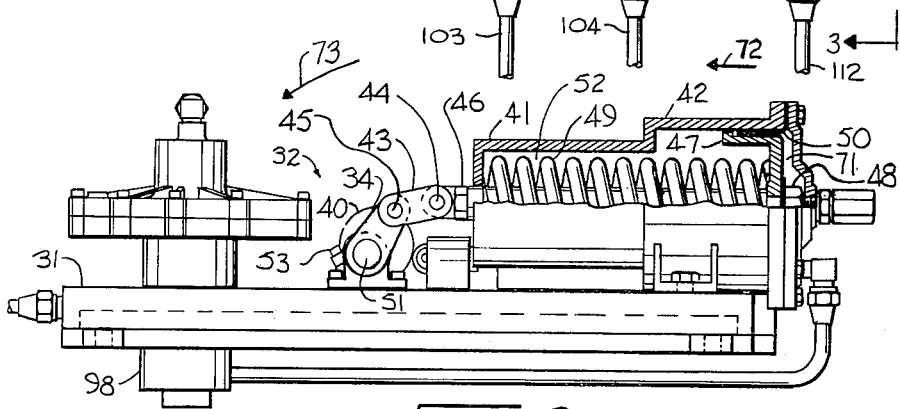
FIG. 3 is a side elevation of the control panel taken substantially along line 3—3 of FIG. 2 and illustrates the structure of a pressure-proportional linear actuator and oscillating cam means.
Figure 4:
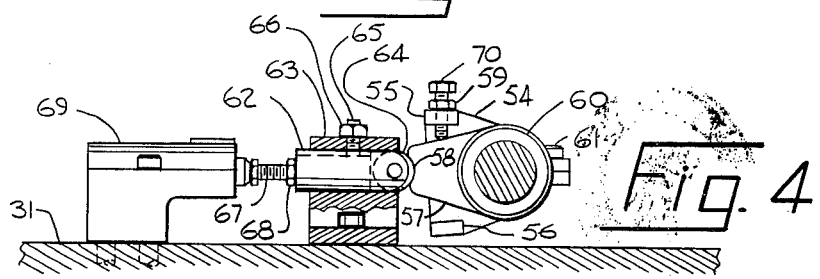
FIG. 4 is a partial sectional view of a time-delay cam taken substantially along line 4—4 of FIG. 2.

Turning now to panel 17, FIGS. 2, 3, and 4 illustrate the essential mechanical structure of my present invention referenced to the schematic diagram of FIG. 1. Panel 17 comprises a base means 31 upon which oscillating cam means 32 is pivotally mounted in bearings 33. Cam means 32 includes cam shaft 51, torque arm means 34, throttle cam 35, throttle boost cam 36, throttle boost time-delay cam 37, non-lag time-delay cam 38, clutch cam 39, and brake cam 40. Cams 35, 36, 39, and 40 are similarly elementary in structure, secured to and adjustable with respect to shaft 51 by means of bolts 53.

Time-delay cams 37 and 38, referenced to FIG. 4, comprise cam actuator 54 secured to and pivotally adjustable with respect to cam shaft 51. Cam actuator 54 includes ears 55 and 56 extending axially from one side thereof, timing adjustment bolt 70 being threadably mounted in ear 55 and including timing lock-nut 59. Cam member 57, having detent 58, is pivotally mounted on cam shaft 51 and extends radially outward between ears 55 and 56. Axial collar 60 is secured to cam shaft 51, thereby maintaining cam member 54 in its operative position adjacent to cam actuator 54 and between ears 55 and 56.

The function of time delay cams 37 and 38 is to permit a limited amount of oscillatory motion of cam means 32 prior to actuation of valves 76 and 77 in either one or both oscillatory directions. This oscillatory motion is a direct function of the pivotal motion cam member 57 is permitted between ears 55 and 56 of actuator 54. Hence, roller 64 rests in detent 58 until ear 56 impels cam 57 away from roller 64; conversely, roller 64 returns to detent 58 when bolt 70 so impels it. In either one or both oscillatory directions, a time-lag is provided between commencement of pivotal movement of shaft 51 and actuation of valves 76 and 77.

Cam means 32 actuates a plurality of cam followers 62 slidably mounted in bearings 63 which are in turn secured to base 31. Insofar as cams 37 and 38 are concerned, roller 64 rests in detent 58 and is dislodged therefrom depending upon the oscillatory movement of cam means 32; cam followers 62 merely follow the contours of cams 35, 36, 39, and 40. Guide bolts 65 and lock nuts 66 in bearings 63 serve to secure followers 62 against rotation. Timing adjustment bolts 67 and locknuts 68 provide fine timing adjustment of a plurality of cam actuated valves 69, once cams 35, 36, 37, 38, 39 and 40 are substantially adjusted and finally secured to shaft 51.

Operatively mounted in base 31 and pivotally interconnected to torque arm means 34 is pressure-proportional linear actuator means 41. Cylinder portion 42 is secured to base 31 and one end of rod portion 46 is pivotally interconnected to link 43 by means of pin 44; link 43 is pivotally interconnected to torque arm 34 by means of pin 45. Piston portion 47 is secured to the other end of rod portion 46 by means of nut 48. Interposed between piston portion 47 and cylinder portion 42 is pressure proportional spring means 52, in this case illustrated as a mechanical compression coil spring 49, other equivalent spring means being readily applicable as will be apparent to one skilled in this art. Piston portion 47 includes a low-hysteresis rolling diaphragm sealing means 50 secured to both piston portion 47 and cylinder portion 42. Clearly, pressurized fluid flow into chamber 71 will cause piston 47 and rod 46 to move in direction 72 and cam means 32 to pivot in direction 73; oscillatory movement of cam means 32 clearly will be effected by changes in the magnitude of fluid pressure in chamber 71.

With reference again to FIG. 1, remote control panel 17 comprises valve and ducting means adapted to receive and utilize engine control signals from stations 15 and 16. First, mounted on base 31 in operative relation with cams 35 through 40 are throttle valve 74, first throttle-boost valve 75, second throttle-boost valve 76, non-lag valve 77, clutch valve 78 and brake valve 79. Valves 74 through 79, in practice, are normally-closed two-position three-way fluid control valves. Cams 35 through 40 are shaped and positioned on shaft 51 such that their respective valves remain opened and closed in a desired configuration in a rest or neutral mode of engine 18, and are successively opened and closed in a desired timed sequence in shifts out of neutral into a drive mode.

Throttle valve 74 and throttle-boost valve 75 are duct-connected in parallel to shuttle-valve 80 which permits reversible flow to and from either one of valves 74 and 75. Throttle valve 74 is duct connected in series to flow control valve 81 and, through shuttle valve 30, to either of throttle control valves 27. Throttle-boost valves 75 and 76 are duct-connected in series with each other, pressure regulator 82 and fluid source 11; regulator 82 determines and controls throttle-boost pressure, in practice usually at a level substantially lower than that of source 11 and in throttle control duct 83. Throttle control device 20 is duct connected to shuttle-valve 80 whereby to receive pressurized fluid signals from either of valves 74 or 75. It will be evident to one skilled in this art that a clutch control signal, originating at either of valves 25, passing through shuttle-valve 28 and adjustable by-pass flow-control valve 84, may be duct-connected by duct 85 directly to clutch device 21; in this case chamber 71 of linear actuator 41 must be directly duct-connected to duct 85. Hence linear actuator 41 controlling oscillatory movement of cam means 32 when a clutch signal is received from either of valves 25, opens and closes valves 75 and 76 respectively such that engine 18 receives a throttle-boost just as clutch 21 commences engagement, thus preventing stalling of engine 18, and valve 74 is ultimately opened whereby throttle control is transferred to either of valves 27 once clutch 21 is fully engaged. Time-delay cam 37 ensures that throttle-boost valve 76 remains fully open when clutch 21 is being engaged while a time-delay lag occurs such that no throttle boost occurs during clutch disengagement.

A pair of normally-closed two-position two-way pilot-operated relay valves 86 and 87 are duct-connected in paralled to accumulator means 88 and non-lag valve 77. Valves 86 and 87 are duct-connected in parallel respectively with flow control valves 84 and 89. Check valves 90 and 91 permit flow only from accumulator 88 through valves 86 and 87. Flow control valve 91 duct-connects valve 77 to fluid source 11 and permits flow through valve 77 at a rate in practice only slightly less than the flow rate through valves 84 and 89. Relay valve pilot portions 93 and 94 are duct-connected in series with clutch control valves 25 and 26 respectively.

A pair of normally-closed, two-position three-way differential interlock valves 95 and 96 are duct-connected in parallel to clutch valve 78. Clutch valve 78 is duct-connected to source 11 and maintained closed in the neutral mode of engine 18. Valve 95 is duct-connected in series with quick-release valve 97 and clutch device 21; valve 96 is duct-connected in series with quick-release valve 98 and clutch device 22. Clutch devices 21 and 22 are duct-connected in parallel, through shuttle valve 99 to linear actuator 41. Clutch control valves 25 and 26 are duct-connected to the high pressure pilot portions 105 and 106 of valves 95 and 96 respectively; fluid accumulators 100 and 101 facilitate timing adjustment referenced to flow control valves 84, 89, and 92. Low pressure pilot portions 107 and 108 of first and second differential valves 95 and 96 are duct-connected respectively to second and first clutch devices 21 and 22, whereby valve 95 cannot be opened by valves 25 unless the pressure in clutch device 22 is substantially zero, and vice versa. In this way clutch devices 21 and 22 are interlocked such that only one clutch may be engaged at a time. It should be noted that a soft-engage flow control valve 109 is duct-connected in parallel with valve 78 whereby clutch engagement may be accomplished in two-stages once either of valves 95 or 96 is opened.

Brake valve 79 is duct-connected in series with pressure regulator 102 and source 11; regulator 102 determines the fluid pressure necessary to actuate brake means 23. Cam means 32 maintains valve 79 open to source 11 when engine 18 is in its neutral mode and open to exhaust when either clutch 21 or 22 commences engagement. Brake means 23 stops member 19 in a shift from clutch 21 or clutch 22 to each other or to neutral.

Consider now the specific operation of my present invention, with reference to FIG. 1. In the neutral mode of engine 18, valves 25, 26, and 27, 86, 87, 74, 75, 78, 95 and 96 are closed to source 11; valves 76, 77, and 79 are open to source 11. Hence fluid pressure in chamber 71 and ducts 103 and 104 is substantially zero (referenced to ambient), clutch devices 21 and 22 are disengaged, accumulator 88 is charged, accumulators 100 and 101 are exhausted, brake means 23 is engaged, and throttle control 20 is in an idle configuration.

Actuation of one of valves 25 permits fluid from source 11 to flow through shuttle valve 28 and flow control valve 84 into duct 85. A pressure signal in pilot portions 93 opens valve 86 and a fluid charge in accumulator 88 is transmitted substantially without delay, irrespective of distance of station 15 from panel 17 and the setting of valve 84, to high-pressure pilot portion 105 of valve 95. Valve 95 opens to soft-engagement valve 109, thus commencing engagement of clutch 21. Simultaneously with commencement of soft-engagement of clutch 21, fluid flows into chamber 71, thus also commencing oscillation of cam means 32. Valve 79 is opened to exhaust brake means 23 and valve 75 is opened to valve 76, thus releasing member 19 and boosting the throttle of engine 18 at substantially the same time. Continuing movement of cam means 32 opens valve 78 to source 11 and closes valve 76 to source 11, at substantially the same time, thus causing clutch 21 to become fully engaged and cam means 32 rapidly to complete its movement. At the end of its movement, cam means 32 opens valve 74 to pressure varying throttle control valve 27, thus passing full throttle control to station 15, and valve 77 opens accumulator 88 to exhaust. Likewise, actuation of valves 26 at one of stations 15 or 16 causes clutch device 22 to become fully engaged and full throttle control to be passed to valve 27 at the same station.

Disengagement of clutch 21 and return of engine 18 into a neutral mode is accomplished by de-actuating valve 25, thus opening duct 85 to exhaust through check-valve by-pass of valve 84. At substantially the same time, differential valve 95 opens duct 110 to exhaust and quick-release valve 97 opens to exhaust duct 103 and chamber 71 of linear actuator 41. Movement of cam means 32 now opens valve 74 to exhaust throttle device 20. Time delay cam 37 maintains valve 76 closed to source 11 until cam 36 closes valve 75 at the neutral position of cam means 32. Time delay cam 38 maintains valve 77 closed to source 11 until cam means 32 reaches its neutral position. Cam 39 closes valve 78 to source 11. At the end of movement to neutral of cam means 32, valve 75 closes to valve 76, valve 76 opens to source 11, valve 77 opens accumulator 88 to source 11, and valve 79 opens brake 23 to source 11. Hence, return of engine 18 to neutral operating mode is achieved without a throttle-boost, accumulator 88 receives a charge of non-lag actuating fluid, clutch 21 is fully disengaged, throttle control 20 returns to an idling mode, and brake 23 stops driven member 19. Accordingly, disengagement of clutch device 22 is achieved by de-actuation of valves 26 and 96.

A shift from one clutch mode into another without pause at either station 15 or 16 is accompanied by a timed pause in the operation of clutch devices 21 and 22 such that brake 23 may stop member 19 after one clutch is disengaged and before the other clutch is engaged. For example, such a shift is achieved at either of stations 15 or 16 by suddenly de-actuating valve 25 and instantly actuating valve 26, as in the case of a crash-stop on a marine vessel. Duct 85 is exhausted by valve 25 and valve 95 opens duct 110 to exhaust, thus opening duct 103 to exhaust through quick-release valve 97. Valve 26 now opens duct 111 and pilot portion 94 to source 11 thus opening valve 87 to accumulator 88. However, in this case, valve 25 having just been open, accumulator 88 has been exhausted through valve 77. Therefore, fluid controlling clutch 22 must now pass through flow control valve 89 into high pressure pilot portion 106; until fluid pressure in accumulator 101 and pilot portion 106 has risen sufficiently to overcome the normally closing spring force of valve 96, and until fluid pressure in duct 103 has dropped substantially to zero, valve 96 remains closed. Meanwhile, during this controlled pause, chamber 71 is exhausted through quick release valve 97, cam means 32 returns to the neutral mode, and brake 23 is actuated by valve 79, thus stopping member 19. The length of this pause depends on the flow control setting of valve 89, the differential actuation characteristics of valve 96, and the size of accumulator 101. Once valve 96 is actuated, clutch 22 is fully engaged and full control of throttle device 20 passed to valve 27, through actuation of valves 74 through 79, just as described above in the case of the engagement of clutch 21 out of neutral. A sudden shift in operating mode from clutch device 22 to clutch 21 is accomplished in like manner.

It is believed that my invention of an engine remote control apparatus will have been clearly understood from the foregoing detailed description of my now preferred and illustrated embodiment. Various modifications, changes, additions, and equivalents may be resorted to in view of these teachings by one skilled in this art without departing from the spirit of my invention. For instance, where accumulators are indicated in FIG. 1, long ducts often suffice. Check valves 90 and 91 have many substantial equivalents among fluid control devices in the art and may be integrally included in relay valves 86 and 87. A valve and ducting means or system may include a variety of fluid conditioner, fluid control, and fluid modifying valves which will not detract from the scope, structure and function of my present invention. Moreover, a valve and ducting means may include ducting means wholly or in part contained in base means 31. Therefore, whereas a choice between such variations, modifications, changes, additions, and equivalents falling within the true scope of my invention will depend largely upon the circumstances in which my invention is used, it is my express intention that no limitations be implied and that the hereto annexed Claims be given the broadest interpretation to which the language fairly admits.

The embodiments of the invention in which an exclusive property or privilege is claimed are defined as follows:

1. A remote engine control apparatus comprising a pressurized fluid source, clutch and throttle fluid control valves duct-connected in parallel to said pressurized fluid source, fluid controlled clutch and throttle devices, valve and ducting means interconnecting said clutch and throttle control valves respectively to said clutch and throttle devices, a pressure-proportional linear actuator means operatively duct-connected in parallel with said clutch device and said clutch control valve, an oscillating cam means operatively supported with respect to and operatively connected to said pressure-proportional linear actuator means, said valve and ducting means including a throttle valve and a pair of throttle-boost valves operatively mounted for actuation by said cam means, said throttle fluid control valve and said throttle valve duct-connected in series to a shuttle valve, said pair of throttle-boost valves duct-connected in series with said fluid source and said shuttle valve, said shuttle valve duct-connected to said throttle device, whereby actuation of said clutch device is accompanied by sequential actuation of said pair of throttle-boost valves and said throttle valve.

2. A remote engine control apparatus as defined in claim 1, wherein said cam means includes a time-delay cam, said time-delay cam actuating one of said throttle-boost valves.

3. A remote engine control apparatus as defined in claim 1, wherein said valve and ducting means further includes non-lag relay valve and ducting means, said cam means further including time delay cam means, a non-lag valve operatively mounted for actuation by said time-delay cam means, said non-lag valve duct-connected in series with said fluid source and said non-lag relay valve.

4. A remote engine control apparatus as defined in claim 1, including additional clutch and throttle fluid control valves, said valve and ducting means including shuttle valves operatively duct-connecting in parallel each clutch and throttle fluid control valve respectively with each other clutch and throttle fluid control valve.

5. A remote engine control apparatus as defined in claim 1, wherein said clutch and throttle fluid control valves include first and second clutch fluid control valves, said fluid controlled clutch and throttle devices including first and second clutch devices, said cam means including a time-delay cam, a non-lag valve operatively mounted for actuation by said time-delay cam and duct-connected to said pressurized fluid source, said valve and ducting means including a non-lag accumulator duct-connected in series with said non-lag valve and a pair of relay valves duct-connected in parallel to said accumulator, a pilot portion of each of said relay valves duct-connected in parallel with each of said first and second clutch fluid control valves, each of said relay valves duct-connected in series with a check valve and in parallel with one of said first and second fluid controlled clutch devices and one of said first and second clutch fluid control valves.

6. A remote engine control apparatus as defined in claim 1, wherein said valve and ducting means further includes brake valve and ducting means, said cam means further including brake cam means, brake means interconnected to an engine driven member and duct-connected in series with said brake valve.

7. A remote engine control apparatus as defined in claim 1, wherein said clutch and throttle fluid control valves include first and second clutch control valves, said fluid controlled clutch and throttle devices including first and second clutch devices, said cam means including a clutch cam, a clutch valve operatively mounted for actuation by said clutch cam and duct-connected to said pressurized fluid source, said valve and ducting means including first and second differential interlock valves each having high and low pressure pilot portions, said first and second clutch control valves duct-connected respectively to the high pressure pilot portions of said first and second differential interlock valves, said first and second differential interlock valves duct connected in parallel to said clutch valve and respectively in parallel with said first and second clutch devices and the low pressure pilot portions of said second and first differential interlock valves.

8. A remote engine control apparatus as defined in claim 7, wherein a soft-engage flow control valve is duct-connected in series with said pressurized fluid source and in parallel with said clutch valve and said first and second differential interlock valves.

9. A remote engine control apparatus as defined in claim 5, wherein said valve and ducting means further includes clutch interlocking differential valve and ducting means.

10. A remote engine control apparatus as defined in claim 1, wherein said cam means includes a brake cam, a brake valve operatively mounted for actuation by said brake cam and duct-connected to said pressurized fluid source, a fluid controlled brake means operatively mounted with respect to an engine driven member, said brake means duct-connected to said brake valve.

11. A remote engine control apparatus as defined in claim 7, wherein said cam means includes a brake cam, a brake valve operatively mounted for actuation by said brake cam and duct-connected to said pressurized fluid source, a fluid controlled brake means interconnected to an engine driven member, said cam means substantially and simultaneously opening and closing said clutch and brake valves respectively.

12. A remote engine control apparatus as defined in claim 5, wherein said valve and ducting means further includes quick-release valve and ducting means operatively connected to said clutch devices and said linear actuator.

13. A remote engine control apparatus as defined in claim 1, wherein said valve and ducting means includes a plurality of operator control stations having clutch and throttle control valves operatively interconnected with shuttle valves.

14. A remote engine control apparatus as defined in claim 1, wherein said clutch and throttle fluid control valves include first and second clutch control valves, said fluid controlled clutch and throttle devices including first and second clutch devices, said valve and ducting means including first and second differential interlock valves each having high and low pressure pilot portions, said cam means including a time-delay cam and a clutch cam and a brake cam, first and second non-lag relay valves each having a pilot portion, a non-lag valve and clutch valve and brake valve operatively mounted for actuation by said time-delay cam and said clutch cam and said brake cam respectively and duct-connected in parallel to said pressurized fluid source, a fluid controlled brake device interconnected to an engine driven member and duct-connected to said brake valve, said first and second clutch control valves duct-connected in parallel respectively with said pilot portion of said first and second non-lag relay valves and the high-pressure pilot portion of said first and second differential interlock valves, said first and second differential interlock valves duct-connected in series with said first and second clutch devices respectively and in parallel with said clutch valve, said first and second non-lag relay valves duct-connected in parallel to said non-lag valve and respectively in parallel with said first and second clutch control valves.

15. A remote engine control apparatus comprising a pressurized fluid source, a throttle control valve and first and second clutch control valves duct-connected in parallel to said pressurized fluid source, fluid controlled throttle and first and second clutch devices, a pressure proportional linear actuator duct-connected to said first and second clutch devices, an oscillating cam means supported with respect to and interconnected to said pressure-proportional linear actuator, a throttle valve actuated by said cam means and duct-connected in series with said throttle control valve and said throttle device, a pair of throttle-boost valves actuated by said cam means and duct-connected in series with each other and with said pressurized fluid source and in parallel with said throttle valve, a non-lag valve actuated by said cam means and duct-connected in series to said fluid source, first and second relay valves duct-connected in parallel to said non-lag valve and having pilot portions duct-connected in parallel respectively with said first and second clutch control valves, a clutch valve actuated by said cam means and duct-connected to said pressurized fluid source, first and second differential interlock valves duct-connected in parallel to said clutch valve, said first and second interlock valves having high pressure pilot portions duct-connected respectively to said first and second clutch control valves and low pressure pilot portions duct-connected respectively to said second and first clutch devices, a brake valve actuated by said cam means and duct-connected in series with said fluid source and a brake means interconnected to an engine driven member, whereby actuation of either of said first or second clutch control valves is accompanied by sequential actuation of one of said clutch devices and said throttle device and said brake means.

* * * * *